United States Patent
Shin et al.

[11] Patent Number: 5,713,026
[45] Date of Patent: Jan. 27, 1998

[54] ERROR-PREVENTING SYSTEM HAVING A SIGNAL CORRECTION UNIT

[75] Inventors: Seung-Kee Shin; Tae-Wook Kim, both of Suwon, Rep. of Korea

[73] Assignee: Samsung Electronics Co., Ltd., Suwon, Rep. of Korea

[21] Appl. No.: 490,544

[22] Filed: Jun. 9, 1995

[30] Foreign Application Priority Data

Jun. 15, 1994 [KR] Rep. of Korea ............. 94-13941

[51] Int. Cl.[6] ............................................ G06F 13/00
[52] U.S. Cl. ................................. 395/733; 395/739
[58] Field of Search ............................ 395/733, 739

[56] References Cited

U.S. PATENT DOCUMENTS 4,760,516  7/1988  Zwick ........................... 395/733
5,475,846  12/1995 Moore ........................... 395/700

Primary Examiner—Robert W. Beausoliel, Jr.
Assistant Examiner—P. Vales
Attorney, Agent, or Firm—Cushman Darby & Cushman Intellectual Property Group of Pillsbury Madison & Sutro LLP

[57] ABSTRACT

An error preventing system for card service interrupt signals in a personal computer using a plurality of card interface controllers, which includes at least two PCMCIA (Personal Computer Memory Card International Association) cards, at least two PCICs (PCMCIA Card Interface Controllers) which each output an interrupt signal to service the respective PCMCIA card and operate a portable computer through this process, and a signal-correction unit which inputs the interrupt signal output from the PCICs and outputs the corresponding signals after processing the outputted interrupt signals of logic OR. For preventing an error and a system-halt while prohibiting the collision between signals to transmit the accurate card service interrupt signal in case each PCIC outputs a respective card service interrupt signal.

4 Claims, 3 Drawing Sheets

ERROR-PREVENTING SYSTEM HAVING A SIGNAL CORRECTION UNIT

BACKGROUND OF THE INVENTION

(1) Field of Invention

The present invention relates to an error preventing system for card service interrupt signals in a personal computer using plural PCMCIA Card Interface Controllers (PCMCIA means Personal Computer Memory Card International Association, hereinafter, PCMCIA). Particularly, this invention relates to a means which prevents an error of a card service interrupt signal from causing a collision between signals in using PCIC (PCIC means PCMCIA Card Interface Controller) for a system which uses more than two PCICs controlling PCMCIA cards, where each PCIC delivers CS-IRQs(Card Service Interrupt Requests) to the computer. PCMCIA cards are also known as PC cards.

(2) Description of the Prior Art

In a portable personal computer or a word processor like a notebook-sized personal computer, all structural elements of the computer are miniaturized for the convenience of the user who works to carry the computer. According to the trend of miniaturized, new standards for the structural elements which are used in the portable computer have been established, and the new structural elements are manufactured and commercialized into the market according to these new standards. As to the PCMCIA, new standards have been established for PCMCIA cards of which functions are extended if there is any connection between the PCMCIA card and the outside system through a connector of the portable computer. Accordingly, new PCMCIA card and a PCIC for driving the PCMCIA card have been manufactured, and used. Among types of PCMCIA cards there is an extended memory card, a MODEM (Modulator and Demodulator) card, a LAN (Local Area Network) card, and a HDD (Hard Disk Driver) card.

Formerly, a computer system which uses more than two PCICs comprised, as illustrated in FIG. 1, a computer 10, a first PCIC 20 and a second PCIC 30 of which each interrupt terminal (CS-IRQ) is connected to the input terminal of the computer, the first and the second PCMCIA cards 41, 43 which are mounted in a respective slot or slots are connected by a connector (which is not illustrated) to an output terminal of the first PCIC 20. The third and the fourth PCMCIA card 45,47 which are mounted in a repective slot or slots are connected by a connector (which is not illustrated) to an output terminal of the second PCIC 30.

The first PCIC 20 interrupt signal line and the second PCIC 30 interrupt signal line are connected with each other and linked to the computer 10. The first and the second PCICs 20 and 30 output a card interrupt signal (CS-IRQ) as high-active state to the computer 10 in order to use the PCMCIA card mounted in the respective slot. In normal conditions, the card service interrupt signal (CS-IRQ) is outputed as low state. As described above, in case the first PCIC 20 outputs a card interrupt signal (CS-IRQ) as high-active state to the computer 10 in order to use the PCMCIA card mounted in the repective slot and the second PCIC 30 outputs a low-state card service interrupt signal (CS-IRQ) as normal condition with a cascade mode or a parallel mode in the former system. These two signals are made to collide with each other on the signal line which is appointed for the card service according to the chipset to be used. That is, if the first PCIC 20 outputs the card service interrupt signal (CS-IRQ) as high state and the second PCIC 30 outputs it as low state, these two signals collide with each other on the interrupt signal line, and the card service interrupt signal (CS-IRQ) is inputted to the computer 10 as an unstable state between 2.0–1.4V, which is neither a high state nor a low state. Consequently, the computer system can be down and operates abnormally.

Therefore, in the prior system using only one PCIC, in case one PCMCIA controller is used in one system, there is no problem in outputting an interrupt request signal to service the PCMCIA card. However, in case than more than two PCMCIA controllers are used in one system in a cascade mode or a parallel mode, there are problems of collision accompanied by the interrupt request to use each card, and consequently the system goes down or is subject to damage.

To solve these problems, there has previously been proposed a computer system that uses a polling method in which each terminal waits a processing signal from the controller to transmit and receive the signal. However this polling method also has another problem, in that it decreases the entire performance, and has an adverse effect on power management, and increases power consumption of the battery in a portable computer.

In addition, to solve that problem there has previously been provided a computer system which has an IC to perceive the unstable state of the signal from a collision. However, in this case, frequently, the IC may not perceive the unstable signal accurately, and then has the same problems as in the polling method.

SUMMARY OF THE INVENTION

An object of the present invention is to solve the problems of prior art. That is, it is to provide a means which prevents an error and a system-halt in a system using plural PCICs to prohibit the collision between signals, so as to transmit accurate card service interrupt signal in case each PCIC outputs a card service interrupt signal.

To achieve this object, the present invention provides:

three or more PCMCIA cards;

two or more PCICs, which each output an interrupt signal to service respective ones of the PCMCIA card and operate a portable computer; and a signal correction unit, which receives the interrupt signal from the plural PCICs and outputs corresponding signals after processing of logic OR.

DESCRIPTION OF THE PREFERRED EMBODIMENTS

Preferred embodiments of the invention are described hereinbelow, with reference to the accompanying drawings.

Figure 1:
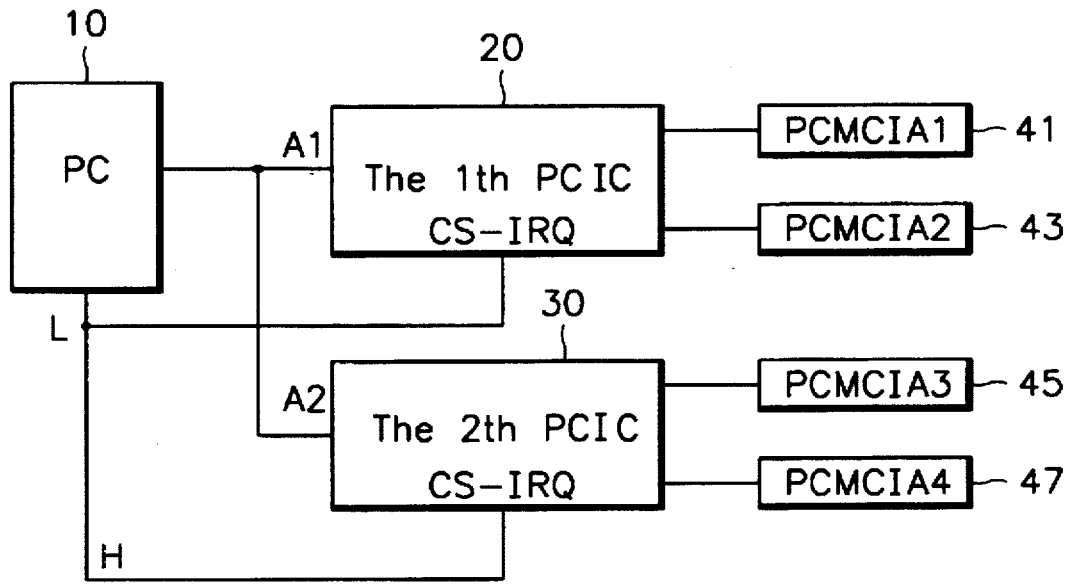
FIG. 1 is a configuration block diagram of a prior art error-preventing system for card service interrupt signal in a personal computer using plural (i.e. at least two) PCICs.
Figure 2:
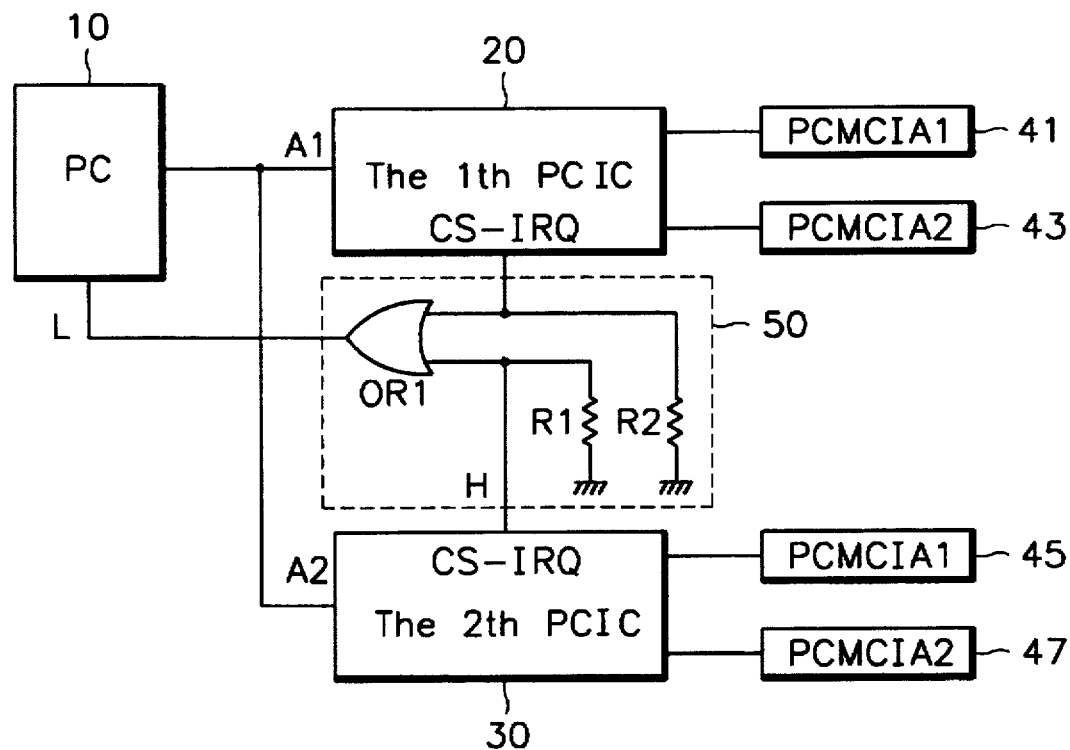
FIG. 2 is a configuration block diagram of an error preventing system for card service interrupt signals from plural (i.e. at least two) PCICs according to a preferred embodiment of the invention.

As shown in FIG. 2, an error-preventing means for card service interrupt signals in a personal computer using plural (i.e. at least two) PCICs according to a preferred embodiment of the invention includes:

- a computer 10;
- a first PCIC 20, having an input terminal A1 connected to the computer 10;
- a second PCIC 30, having an input terminal A2 connected to the computer 10;
- a signal-correction unit 50, having respective input terminals connected with each interrupt terminal (CS-IRQ) of the first PCIC 20 and the second PCIC 30 and having an output terminal is connected to the computer 10;
- PCMCIA cards 41 and 43 which are connected by respective conventional connectors to respective output terminals of the first PCIC 20 and mounted in a respective slot or slots; and
- PCMCIA cards 45 and 47 which are connected by respective conventional connectors to respective output terminals of the second PCIC 30 and mounted in a respective slot or slots.

As the first and the second PCICs 20 and 30, 82365SL chips from INTEL Co. commonly are used.

The signal-correction unit 50 (FIGS. 2-5) comprises:

- an OR-gate OR1, of which a first input terminal is connected to the interrupt terminal (CS-IRQ) of the first PCIC 20, a second input terminal is connected to the interrupt terminal (CS-IRQ) of the second PCIC 30, and of which an output terminal is connected to the computer 10;
- a resistor R1 of which one-side terminal is connected to a second input terminal of the OR-gate OR1 and the other-side terminal is grounded; and
- a resistor R2 of which one-side terminal is connected to the first input terminal of the OR-gate OR1 and the other-side terminal is grounded.

For level-stability of the signal output from the first and the second card interface controllers 20 and 30, pull-down resistors R1 and R2 are connected to respective input terminals of the OR-gate OR1.

Operation of an error preventing system for card service interrupt signals of plural PCICs according to a preferred embodiment of the invention is described hereinafter:

When a user, after mounting the PCMCIA cards 41, 43, 45, 47 in repective slot or slots, operates the portable computer, the first PCIC 20 and the second PCIC 30 begin to work. Once the first and the second PCICs 20 and 30 begin to work, they automatically perceive if the PCMCIA cards 41, 43, 45, and 47 are connected in the respective slot through a card perceiving signal not illustrated by performing a program stored in an inner memory. If the PCMCIA cards 41, 43, 45, and 47 are connected in the repective slot and each PCIC is operated in cascade mode or parallel mode, the first and the second PCICs 20 and 30 each normally output low-state signals.

Each low-state signal outputted from the first and the second PCICs 20 and 30 is input to the signal-connection unit 50. The OR-gate OR1 of the signal-connection unit 50 performs a logic OR with the signals and outputs the low-signals to the computer 10. The computer 10 determines that an interrupt signal is not generated in case the interrupt signal input from the signal-correction unit 50 is at a low state. In the normal condition, when the first PCIC 20 outputs a card service interrupt signal, as an active-high state, the card service interrupt signal (CS-IRQ) at high state is inputted to the first input terminal of the OR-gate OR1 in the signal-correction unit 50. At this time, the second PCIC 30 outputs a card service interrupt signal (CS-IRQ) to the second input terminal of the OR-gate OR1 as a high state in which no interrupt signal is needed just as in the normal condition. In this step, the OR-gate OR1 receives the signals which are outputted from the first PCIC 20 and the second PCIC 30, processes a logic OR, and outputs the corresponding high signal to the computer 10. Once a CPU (Central Processing Unit) of the computer 10 perceives that the signal input from the signal-correction unit 50 changes from a low state to a high state, it determines that the first and the second PCICs 20 and 30 generate the interrupt signals, and finds out which PCIC generates the interrupt signal by checking the set points of each PCIC 20 and 30.

Differently from the above case, in case the second PCIC 30 requires a card service interrupt, the interrupt signal output from each PCIC is inputted to the computer 10 without any collision between the signals, and the computer 10 can determine if any interrupt signal has been generated.

Figure 3:
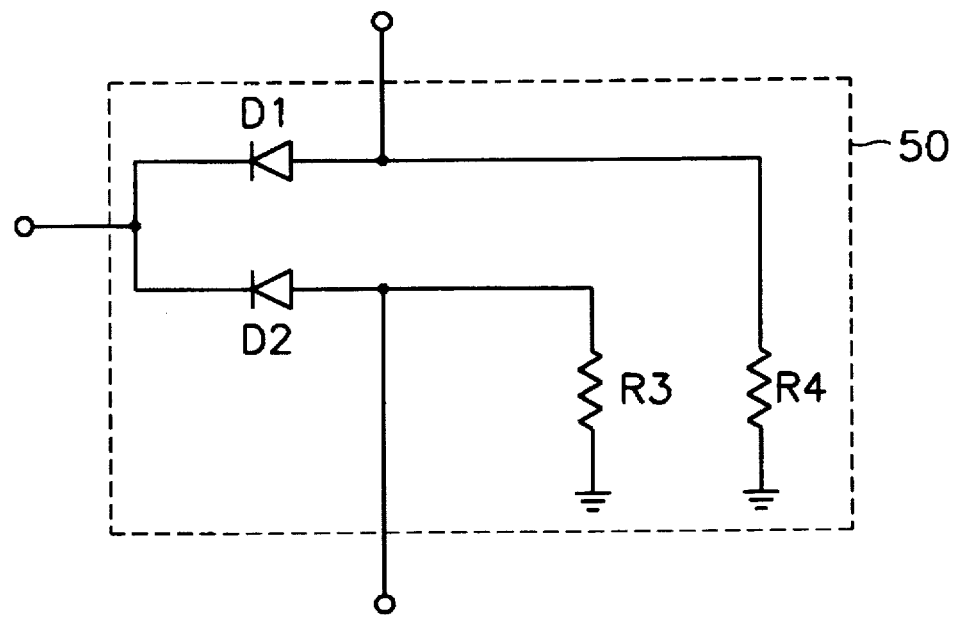
FIG. 3 is a circuit diagram which shows details of one embodiment of the signal-correction unit shown in FIG. 2.
Figure 4:
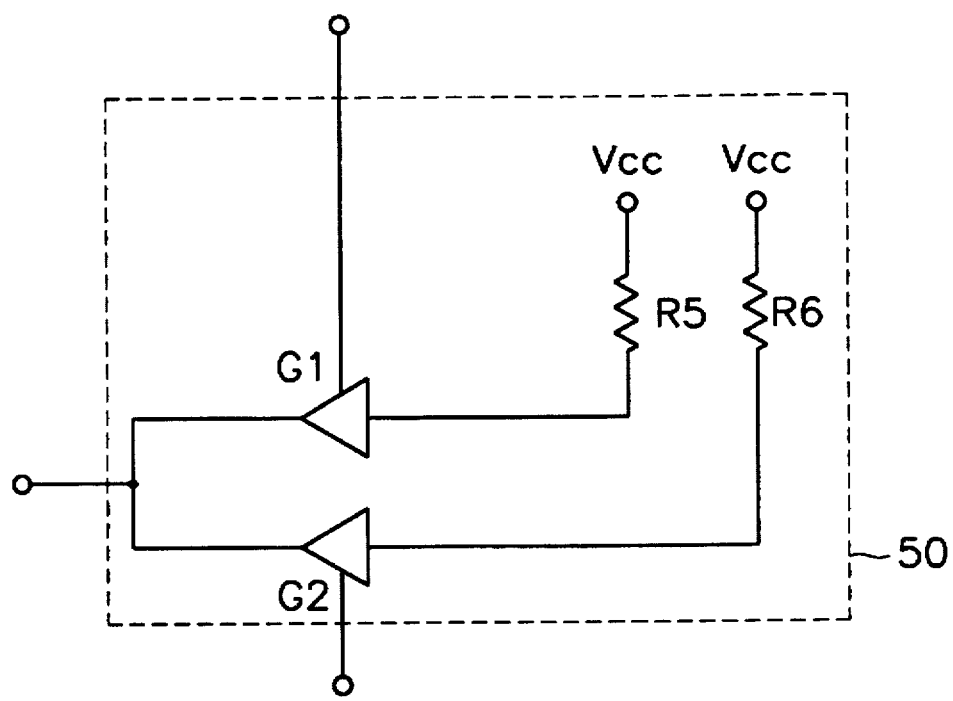
FIG. 4 is a circuit diagram which shows details of another embodiment of the signal-correction unit shown in FIG. 2.
Figure 5:
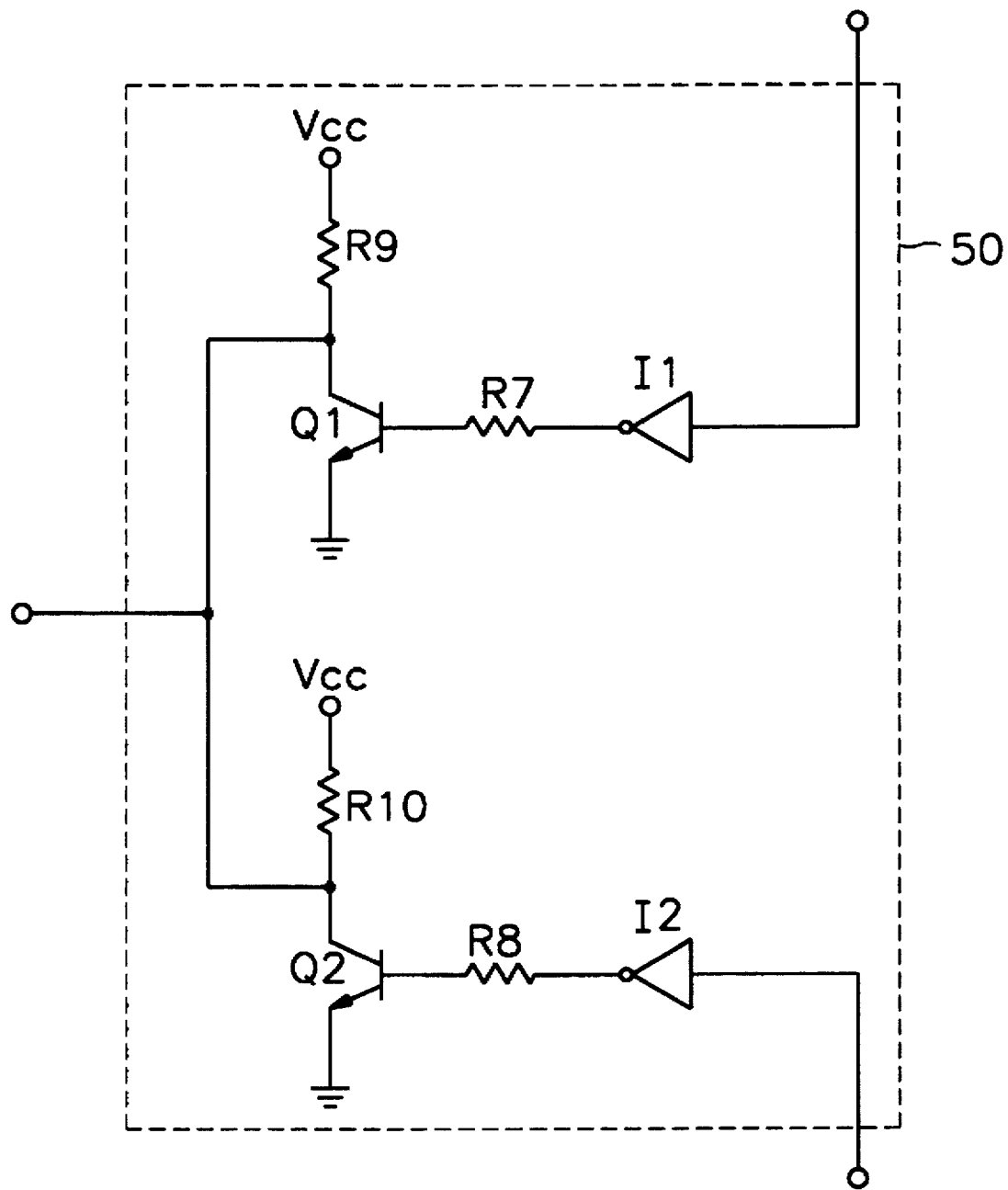
FIG. 5 is a circuit diagram which shows details of a third embodiment of the signal-correction unit shown in FIG. 2.

In this preferred embodiment of the invention, the OR-gate OR1 is used as a means of providing a logic OR of the signal-correction unit 50, however, the technical scope of this invention is not limited to the above-mentioned construction, and there are other constructions, e.g. as illustrated in FIG. 3 to FIG. 5.

FIG. 3 is a circuit diagram which shows one embodiment of the signal-correction unit from FIG. 2.

As illustrated in FIG. 3, one embodiment of the signal-correction unit 50 comprises:

- a diode D1, of which an anode terminal is connected to the interrupt terminal CS-IRQ of the first PCIC 20 and a cathode terminal is connected to the Computer 10;
- a diode D2, of which an anode terminal is connected to the interrupt terminal CS-IRQ of the second PCIC 30 and a cathode terminal is connected to the computer 10;
- a resistor R4, which is connected between the anode terminal of the diode D1 and ground; and
- a resistor R3, which is connected between the anode terminal of the diode D2 and ground.

Each signal outputted from the first PCIC 20 and each signal outputted from the second PCIC 30 is inputted to the signal-correction unit 50. The diodes D1 and D2 of the signal-correction unit 50 output a high-state signal to the computer 10 by being turned on when a high-state signal is inputted thereto. Consequently, the signal-correction unit 50 in FIG. 3 performs logic OR similarly to the signal-correction unit 50 in FIG. 2.

FIG. 4 is a circuit diagram which shows another embodiment of the signal-correction unit in FIG. 2.

As illustrated in FIG. 4, the signal-correction unit 50 comprises:

- Resistors R5 and R6, of which each one-side terminal is connected to power voltage Vcc;
- a three-state gate G1, of which one-side input terminal is connected to the other-side terminal of the resistor R5, another controlling terminal is connected to the interrupt terminal CS-IRQ of the first PCIC 20, and the other-side output terminal is connected to the computer 10; and
- a three-state gate G2, of which one-side input terminal is connected to the other-side terminal of the resistor R6, another controlling terminal is connected to the interrupt terminal CS-IRQ of the second PCIC 30, and the other-side output terminal is connected to the computer 10.

Each signal output from the first PCIC 20 and the second PCIC 30 is inputted to the signal-correction unit 50. The three-state gates G1 and G2 of the signal-correction unit 50 output a high-state signal to the computer 10 by being turned on when a high-state signal is inputted to the controlling terminal.

Consequently, the signal-correction unit 50 in FIG. 4 performs logic OR similarly to the signal-correction unit 50 in FIG. 2.

FIG. 5 is a circuit diagram which shows a third embodiment of the signal-correction unit shown in FIG. 2.

As illustrated in FIG. 5, the signal-correction unit 50 comprises:

an inverter I1, of which an input terminal is connected to the output terminal of the first PCIC 20;

a resistor R7, of which one-side terminal is connected to the output terminal of the inverter I1;

a transistor Q1, of which a base terminal is connected to the other-side terminal of the resistor R7, and an emitter terminal is grounded;

a resistor R9, which is connected between a collector terminal of the transistor Q1 and the power voltage Vcc;

an inverter I2, of which input terminal is connected to the output terminal of the second PCIC 30;

a resistor R8, of which one-side terminal is connected to the output terminal of the inverter I2;

a transistor Q2, of which base terminal is connected to the other-side terminal of the resistor R8 and an emitter terminal is grounded; and a resistor R10, which is connected between a collector terminal of the transistor Q2 and the power voltage Vcc.

Each signal output from the first PCIC 20 and the second PCIC 30 is inputted to the signal-correction unit 50. The inverters I1 and I2 of the signal-connection unit 50 invert these signals and output these signals to the base terminal of the transistor Q1 and Q2. The transistors Q1 and Q2 are turned on when a high-state signal is inputted to the base terminal, and they invert a high-state signal into a low-state signal and output it to the computer 10. Consequently, the signal-correction unit 50 in FIG. 5 performs logic OR similarly to the signal-correction unit 50 in FIG. 2.

As described above, through the preferred embodiments of the invention, there is provided an error-preventing or an interruption preventing means for a card service interrupt signal in a personal computer using plural PCICs, while prohibiting a system-down condition from to result collisions between signals output from each PCIC in case plural PCICs are used in parallel mode in a portable computer.

What is claimed is:

1. An error preventing system for card service interrupt signals in a personal computer using plural card interface controllers, comprising:

at least two PCMCIA (Personal Computer Memory Card International Association) cards;

at least two PCICs (PCMCIA Card interface Controllers), which output respective interrupt signals, each to service at least one said PCMCIA card and thereby operate a personal computer; and a signal correction unit, which receives as an input the respective interrupt signals outputted from said PCICs and outputs corresponding signals after processing said interrupt signals with logic;

wherein said signal correction unit comprises:

an OR-gate, which, after processing said interrupt signals output from said plural PCICs of logic OR, outputs said corresponding signals; and a pull-down resistor for stabilizing said interrupt signals.

2. An error preventing system for card service interrupt signals in a personal computer using plural card interface controllers, comprising:

at least two PCMCIA (Personal Computer Memory Card International Association) cards;

at least two PCICs (PCMCIA Card Interface Controllers), which output respective interrupt signals, each to service at least one said PCMCIA card and thereby operate a personal computer; and a signal correction unit, which receives as an input the respective interrupt signals outputted from said PCICs and outputs corresponding signals after processing said interrupt signals with logic OR;

wherein said signal correction unit comprises:

first and second diodes, which are turned on when an interrupt signal outputted from said plural PCICs is at high state, and outputs a high-state signal; and a pull-down resistor for stabilizing said interrupt signals.

3. An error preventing system for card service interrupt signals in a personal computer using plural card interface controllers, comprising:

at least two PCMCIA (Personal Computer Memory Card International Association) cards;

at least two PCICs (PCMCIA Card interface Controllers), which output respective interrupt signals, each to service at least one said PCMCIA card and thereby operate a personal computer; and a signal correction unit, which receives as an input the respective interrupt signals outputted from said PCICs and outputs corresponding signals after processing said interrupt signals with logic OR;

wherein said signal correction unit comprises:

first and second three-state gates, which are turned on when an interrupt signal output from said PCICs is at a high state, and outputs a high-state signal; and a pull-up resistor for stabilizing said interrupt signals.

4. An error preventing system for card service interrupt signals in a personal computer using plural card interface controllers, comprising:

at least two PCMCIA (Personal Computer Memory Card International Association) cards;

at least two PCICs (PCMCIA Card interface Controllers), which output respective interrupt signals, each to service at least one said PCMCIA card and thereby operate a personal computer; and a signal correction unit, which receives as an input the respective interrupt signals outputted from said PCICs and outputs corresponding signals after processing said interrupt signals with logic OR;

wherein said signal correction unit comprises:

first and second inverters for inverting and outputting interrupt signal output from said PCICs;

first and second transistors, which output input signals from the first and the second inverters after inverting and amplifying such signal; and a resistor, which biases the first and the second transistors.

* * * * *

UNITED STATES PATENT AND TRADEMARK OFFICE
CERTIFICATE OF CORRECTION

PATENT NO. : 5,713,026
DATED : January 27, 1998
INVENTOR(S) : SHIN et al.

It is certified that error appears in the above-identified patent and that said Letters Patent is hereby corrected as shown below:

On the cover page item[22],

Change filing date from "June 9, 1995" to --June 14, 1995--.

Signed and Sealed this

First Day of September, 1998

Attest:

Attesting Officer

BRUCE LEHMAN

Commissioner of Patents and Trademarks